United States Patent [19]

Dubs

[11] Patent Number: 4,834,521
[45] Date of Patent: May 30, 1989

[54] CONVEX VEHICLE REPLACEMENT MIRROR

[76] Inventor: Philip M. Dubs, 9731 NW. 14th St., Plantation, Fla. 33322

[21] Appl. No.: 46,590

[22] Filed: May 4, 1987

[51] Int. Cl.[4] .................. B60R 1/08; G02B 5/10; G02B 7/18
[52] U.S. Cl. .................. 350/631; 350/606; 350/600; 350/625; 248/467
[58] Field of Search ............ 350/631, 606, 600, 641, 350/642, 625, 627, 619, 612; 248/467

[56] References Cited

U.S. PATENT DOCUMENTS

| 3,104,274 | 9/1963 | King | 248/467 |
| 4,223,983 | 9/1980 | Bloom | 350/625 |

FOREIGN PATENT DOCUMENTS

| 2331633 | 6/1974 | Fed. Rep. of Germany | 350/627 |
| 2915580 | 10/1980 | Fed. Rep. of Germany | 350/625 |
| 3222319 | 1/1984 | Fed. Rep. of Germany | 350/606 |
| 2286728 | 4/1976 | France | 350/631 |
| 1058121 | 2/1967 | United Kingdom | 350/631 |

*Primary Examiner*—Jon W. Henry
*Attorney, Agent, or Firm*—Cohen, Pontani & Lieberman

[57] ABSTRACT

A concavo-convex replacement mirror permanently securable coextensively atop a flat plane mirror provided as an original equipment side-mount, rear-view mirror on a motor vehicle. The size and shape of the replacement mirror is predetermined so as to closely correspond to that of the original equipment mirror such that, when operatively positioned, the replacement mirror completely covers and conceals the original equipment mirror. The rear face of the replacement mirror is provided with coplanar mounting portions surface ground at the mirror periphery for conformal abutment with corresponding portions of the flat original equipment mirror. A pressure sensitive adhesive is interposed between the replacement mirror and the original equipment mirror to nonreleasably secure the mirrors to one another and thereby provide an expanded field of vision with respect to that available with the original equipment mirror.

7 Claims, 2 Drawing Sheets

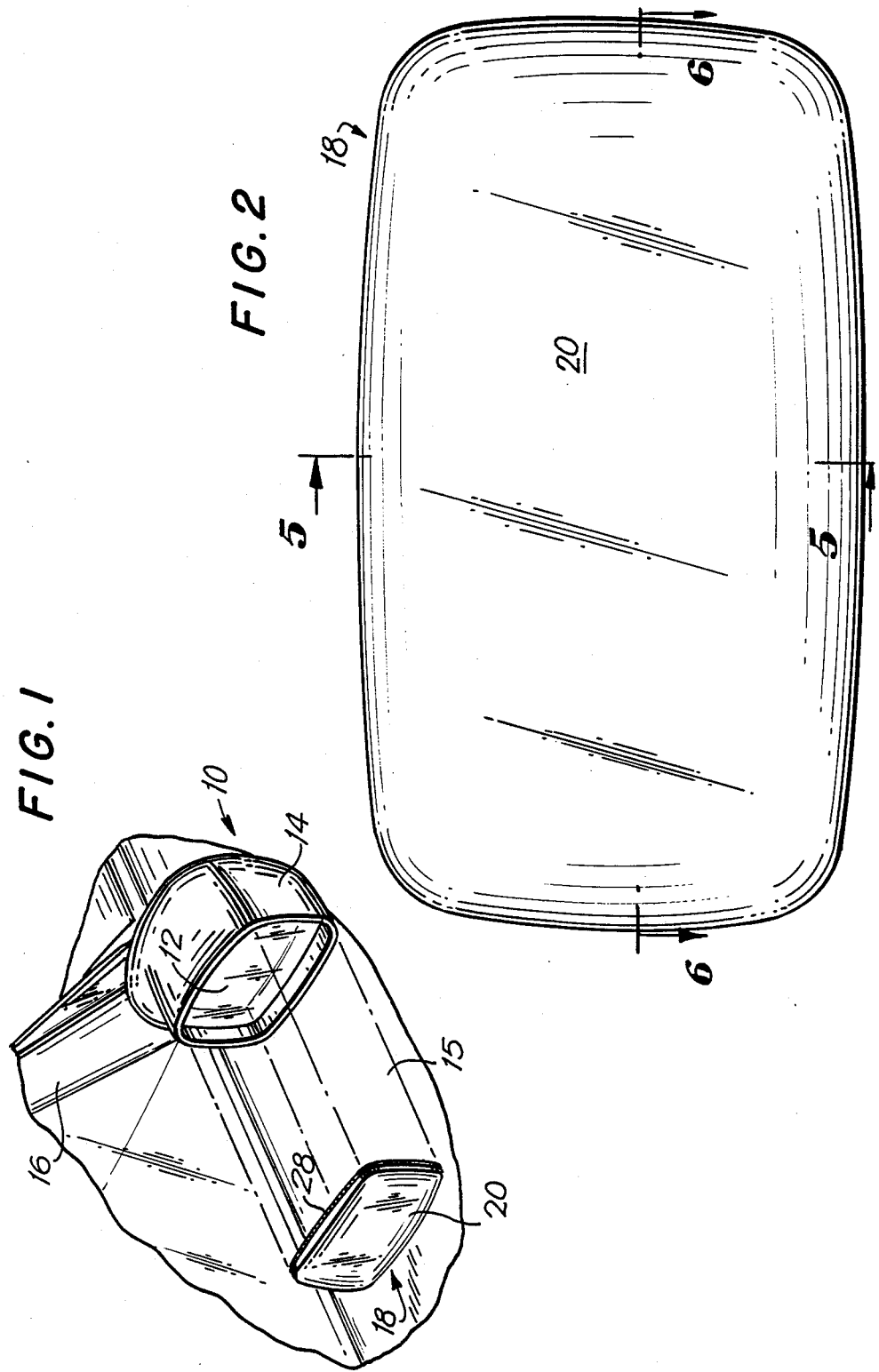

CONVEX VEHICLE REPLACEMENT MIRROR

BACKGROUND OF THE INVENTION

1. Field of the Invention

This invention relates generally to a rear view mirror for use in substituted replacement of an original equipment mirror conventionally provided on a motor vehicle. More specifically, the invention concerns a concavo-convex replacement mirror which provides the operator of the motor vehicle on which it is mounted with an angular and continuous field of view greater than that provided by the original equipment flat plane mirror and nonreleasably secured to and over the original equipment mirror in an advantageously simplified manner.

2. Description of the Prior Art

Secondary mirrors mountable directly to a portion of the reflective viewing surface of the standard flat plane, side mount, rear-view mirror conventionally provided by the manufacturers of motor vehicles are known. For example, King U.S. Pat. No. 3,104,274 teaches the placement of a small, circular, convex mirror atop a portion of the surface of a larger original equipment mirror to form a combination unit characterized by the limited field of view of the flat plane mirror, interrupted by the attached secondary mirror and its somewhat enhanced field of view. Other prior art discloses equivalent and related arrangements utilizing small secondary replacement mirrors for providing a discontinuous but expanded reflected view to the rear and sides of the vehicle, such as U.S. Pat. Nos. 4,200,359 (Lawson), 4,311,363 (Marsalka et al.), 4,223,983 (Bloom), 4,293,191 (Kim) and 4,306,770 (Marhaver). The addition of a small secondary mirror mounted atop a portion of the surface of the original equipment side-mount, flat plane, rear-view mirror of a vehicle to create a combination mirror is thus known. However, in such arrangements the presence of the secondary mirror interferes with the otherwise continuous field of view of the primary mirror and the discontinuity at the juncture of the two reflective surfaces can be confusing and frequently disorienting to the operator of a moving motor vehicle seeking to utilize the resulting combination in investigating the presence of other vehicles to the sides and rear of his own. Moreover, the relatively small size of the secondary mirrors taught by the prior art fails to assure a sufficient reflective surface area effective for a usefully expanded and undistorted field of view. A suitable replacement mirror mountable over and providing a complete substitute for the original equipment flat plane mirror, one which provides the operator with an expanded field of view of the area to the sides and rear of a motor vehicle without introducing the disorienting effects or distortion of the prior art, has not heretofore been available.

SUMMARY OF THE INVENTION

It is accordingly an object of the present invention to provide a replacement mirror having an expanded field of view greater than that of the substantially flat plane mirror provided as an original equipment side-mount, rear-view mirror on a motor vehicle.

It is another object of the invention to provide such a replacement mirror which is permanently securable coextensively directly to and atop the substantially flat plane original equipment mirror.

It is a further object of the invention to provide such a replacement mirror that is readily, reliably and nonreleasably securable directly to the substantially flat plane original equipment mirror.

It is yet another object of the invention to provide such a replacement mirror which has an expanded field of view without the introduction of substantial image distortion.

It is a still further object of the invention to provide such a replacement mirror which provides an expanded field of view and which effectively eliminates substantial blind spots to the sides and rear of the motor vehicle without the presentation of distracting and disorienting discontinuities in the field of vision.

These and other objects of the invention are met by a replacement mirror which includes a constant radius convex reflective surface providing an expanded field of angular view with respect to the flat plane original equipment mirror it replaces. The peripheral size and shape of the replacement mirror closely corresponds to that of the original equipment mirror. The replacement mirror is secured directly to and atop the original equipment mirror by means of specially ground rear face edge portions and an interposed adhesive nonreleasably affixing the replacement mirror in its operative position.

For a better understanding of the present invention, together with other objects, features and advantages thereof, reference is made to the following description in conjunction with the accompanying drawings, with the scope of the invention to be pointed out in the appended claims.

BRIEF DESCRIPTION OF THE DRAWINGS

In the drawings, wherein similar reference characters denote similar elements throughout the several views:

FIG. 1 is a partially exploded elevated perspective view of an original equipment side-mount, rear-view mirror assembly and illustrates the positional relationship thereof with a replacement mirror mountable in accordance with the invention on the original equipment reflective surface;

FIG. 2 is a front view of a concavo-convex replacement mirror constructed in accordance with the invention;

DETAILED DESCRIPTION OF THE PREFERRED EMBODIMENT

Figure 3:
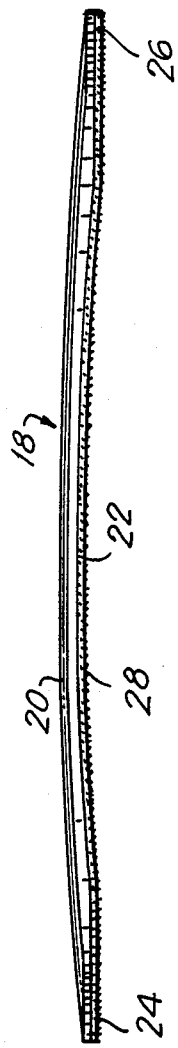
FIG. 3 is a side view from the bottom or lower longitudinal edge of the replacement mirror of FIG. 2.
Figure 4:
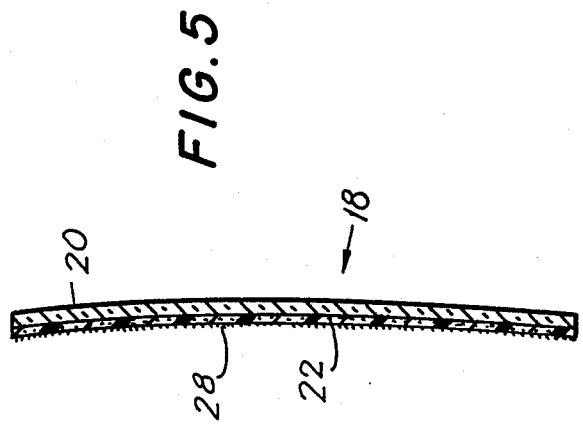
FIG. 4 is a side view from one of the transverse edges of the replacement mirror of FIG. 2.
Figure 5:
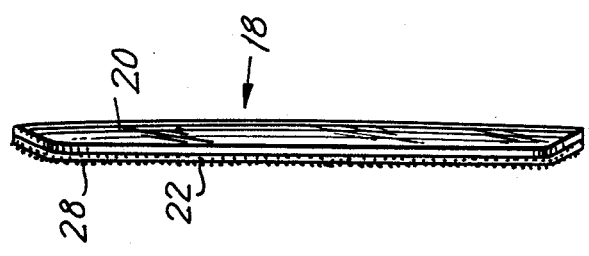
FIG. 5 is a sectional view taken along the lines 5—5 in FIG. 2.
Figure 6:
FIG. 6 is a sectional view taken along lines 6—6 in FIG. 2.

Mirrors mounted externally on the sides of motor vehicles to provide the operator with a field of view to the sides and rear of the vehicle are conventional and well known. Typically, these mirrors are implemented using reflective surfaces of various dimensional configurations—including for example circular, oval, quadrilateral and generally rectangular shapes—as a matter of design choice for a particular motor vehicle. As illustrated in FIG. 1, such mirror assemblies 10 conventionally include a reflective surface 12 disposed either stationary or adjustably within a frame or open-ended housing 14. The housing 14 is mounted in depending relation from one side -in FIG. 1 from the right side 15—of the vehicle by an integral bracket 16. The reflective surface 12, which is commonly manufactured of a glass substrate or base, is generally substantially nonarcuately planar or flat to provide a so-called unity gain mirror as is required by federal regulations for original equipment left-side exterior vehicle mirrors. Although no such requirement presently exists for right-side mirrors, these too are most often implemented with substantially flat plane glass mirrors providing a correspondingly limited angular field of reflected view.

The present invention provides a replacement mirror 18 which is operatively substitutable for the original equipment reflective surface 12. As hereafter described in additional detail, the replacement mirror includes a convex viewing surface 20, by which the vehicle operator is provided with an expanded angular field of reflected view, and mounts over and replaces the substantially flat plane original equipment mirror 12. In accordance with the invention, the peripheral size and shape of replacement mirror 18 matches and conforms to that of the original equipment mirror 12 and replacement mirror 18 is intended to be mounted directly on the reflective surface of original equipment mirror 12. Thus, the replacement mirror 18, when attached, completely covers and conceals the original equipment mirror 12, providing a substituted and notably expanded field of view without sacrificing edge-to-edge continuity in the reflected image and avoiding the substantial image distortion apparent in convex mirrors of relatively small size.

The disclosed embodiment of a replacement mirror 18 in accordance with the invention is constructed of single strength high tensile mirror glass formed to a substantially constant thickness of, for example, approximately 0.093 inches. The mirror glass substrate is of concavo-convex configuration, having a convex viewing face 20 and an oppositely-disposed and substantially parallel concave rear face 22. And the replacement mirror 18 is predeterminately dimensioned to correspond in peripheral size and shape to the original equipment mirror 12 which it replaces so that, when the mirror 18 operatively overlays the original equipment reflective surface 12, the peripheral edges of the mirrors abut in substantial edge-to-edge adjacency. The original equipment mirror 12 is thereby entirely covered and serves as a hidden base or concealed supporting surface for the expanded field replacement mirror 18.

The convex viewing surface 20 of mirror 18 has a constant radius of curvature so as to avoid potentially disorienting apparent distortions which may otherwise be perceived by a vehicle operator and user of the mirror were the mirror's curvature to vary across its face. Indeed, it has been found that the combination of a varying radius of curvature and the relative movement of images as reflected in a convex vehicle mirror can cause motion sickness and related feelings of disorientation whether such radial variations are gradual or stepped at predetermined discontinuities on the mirror surface. The present invention avoids any such potential discomfort to the user by fully covering and entirely replacing the original flat surface mirror 12 so that there are no evident or perceivable discontinuities between the surfaces of the original and replacement reflective surfaces. In any event a constant radius of curvature of between 60 and 120 inches is currently contemplated for the inventive replacement mirror 18, convex reflective surfaces in this range providing an advantageously wide and continuous field of view which effectively eliminates blind spots and minimize distortion of reflected images. In particular, a 60 inch radius of curvature for a right-side mounted rear view passenger vehicle mirror, and a 120 inch radius of curvature for a left-side mounted mirror, are presently preferred in implementing the invention.

The rear face 22 of replacement mirror 18 is specially configured for direct securement to the original flat mirror surface 12. In the embodiment of the invention herein disclosed, the constant thickness of the glass substrate is reduced, by surface grinding of its rear face 22 proximate a pair of its oppositely disposed peripheral edges, to a thickness less than the constant thickness of the mirror glass to thereby form surface flattened mounting portions 24, 26. These flattened edge portions 24, 26 are characterized by a locationally-varying thickness which gradually decreases, moving radially outward from a generally central portion of the mirror, from the aforesaid constant thickness of the mirror glass to a predetermined minimum thickness at the mirror periphery. A minimum thickness at the periphery of the ground mounting portions 24, 26 of approximately 0.05 inches is currently preferred. The surface ground or otherwise thickness-reduced edge portions 24, 26 are thereby rendered flat and coplanar along the rear face 22 of the mirror so that, when the replacement mirror 18 is operatively positioned against the substantially flat original mirror 12, the ground or flattened mounting portions 24, 26 of the concave rear face 22 conformally abut the planar surface of the original mirror 12.

Although the inventive replacement mirror which is illustrated and described herein incorporates a single opposed pair of surface ground or otherwise flattened mounting portions 24, 26, it should be apparent to those skilled in the art that additional flattened edge portions or areas may be provided in other implementations of the invention. Thus, a second relatively transversely-disposed pair of flattened edge regions along the concave rear face of the glass substrate may be included where, for example, the replacement mirror has a peripheral configuration in which each of its edges is of substantially the same length—e.g. a generally square mirror shape. Similarly, a fully round replacement mirror may have a single continuous flattened peripheral portion defined on its rear face for conformal abutment with the original reflective surface 12 which it is intended to replace. All such variations are within the scope and contemplation of the invention.

One of the important and advantageous features of the invention lies in its provision of a replacement reflective surface by which the vehicle operator obtains an uninterrupted and relatively undistorted view of an angularly expanded side and/or rear field about the vehicle. The ability of an operator to effectively make use of this expanded field of view without disorientation and accompanying distraction requires that the angularity of the viewing field be constant such, for example, as is provided where the convexity of the mirror's reflective surface has a constant and nonvarying radius of curvature along its entire surface area. In order to maintain the constant radius of viewing surface convexity while providing the ease, convenience and nonreleasable mounting of the inventive mirror to the flat plane mirror initially supplied on the vehicle the replacement mirror 18 is first surface coated—i.e. the mirror is silvered or otherwise chromed or plated with a reflective coating on its primary or convex viewing surface. First surface coating of the mirror enables its rear face 22 to be surface ground about selected edge portions, to form the coplanar flattened mounting portions 24, 26, without introducing undesired distortions to the reflected image viewable in the mirror 18. First surface coating additionally provides the advantages of a more highly or brightly reflected image than is obtained with a rear or second surface coated mirror and introduces notably less image distortion as there is little or no image transmission through the glass substrate of the mirror.

As previously indicated, the replacement mirror 18 is, in accordance with the invention, mounted nonreleasably to and over the flat plane original equipment reflective surface 12. More particularly, the flattened and coplanar edge mounting portions 24, 26 on the rear face 22 of the replacement mirror 18 are placed into conformal abutment with the corresponding edge portions of the flat mirror 12 (FIG. 1) so that the replacement mirror lies in edge-to-edge adjacency with and thus completely covers and operatively replaces the existing original equipment mirror. By this coextensive and nonreleasable overlaying the replacement mirror is firmly supported by the original mirror, is movable by manual or automated remote manipulation in the manner of the original mirror, and for all purposes substitutes for and takes the place of the original mirror while providing an advantageously enlarged and useful field of reflected view.

In order to effect the intended nonreleasable mounting of the replacement mirror, a suitable adhesive layer 28 is interposed, between the rear surface 20 of mirror 18 and the original equipment reflective surface 12, at least in the area of the flattened coplanar mounting portions 24, 26. Such adhesive may for example take the form of a layer of double-sided pressure sensitive foam adhesive tape, such as is available from the 3M company, although the adhesive may for example take many alternate forms all within the scope and contemplation of the invention. Where such a pressure sensitive tape is supplied on the rear face of the replacement mirror 18, the outwardly-facing side of the tape may be provided with a protective covering (not shown) to avoid inadvertent contact of objects with the otherwise exposed adhesive surface prior to operative mounting of the mirror 18 on the surface 12. For convenience in manufacturing of the inventive mirror, the adhesive may—as shown in the illustrated embodiment—be applied continuously across the full extent of the rear mirror surface 22 or, in still another variation, to areas larger than the mounting portions 24, 26 but smaller than the full extent of the mirror substrate. It is in any event required only that the adhesive 28 be provided at at least the coplanar mounting portions 24, 26 and that it be formulated for nonreleasably securing the replacement mirror 18 to the original equipment reflective surface 12. In the presently preferred form of the invention, a double-sided pressure sensitive adhesive tape is applied to the rear face 22 of the replacement mirror 18 which is then supplied to the user with a protective covering in place atop the outwardly-disposed face of the adhesive tape.

In use, a replacement mirror 18 of the invention corresponding to the peripheral size and shape of the original equipment side-mount, planar rear-view vehicle mirror 12 to be replaced is selected. After cleaning or otherwise appropriately preparing the original equipment reflective surface 12, the protective covering (where present) is peeled off or otherwise removed from the pressure sensitive adhesive 28. The replacement mirror 18 is then carefully positioned against the flat viewing surface of the original mirror 12 such that the mirrors are disposed in edge-to-edge adjacency with the adhesive layer interposed between at least the coplanar mounting portions 24, 26 on replacement mirror 18 and the corresponding surface edge portions of the original flat mirror surface 12. The pressure sensitive adhesive 28 thereby nonreleasably secures the replacement mirror 18 to and coextensively over the original equipment reflective surface 12, providing an expanded and enhanced field of angular view and reflected image continuity and clarity.

While there have thus been shown and described and pointed out fundamental novel features of the invention as applied to a preferred embodiment thereof, it will be understood that various omissions and substitutions and changes in the form and details of the device illustrated and in its use may be made by those skilled in the art without departing from the spirit of the invention. It is the intention, therefore, to be limited only as indicated by the scope of the claims appended hereto.

What is claimed is:

1. In combination:
    a substantially flat plane view mirror mounted on a vehicle; and
    a replacement mirror permanently securable to said substantially flat plane rear view vehicle mirror for replacing said flat mirror and providing an operator of the vehicle with an expanded filed of view, said replacement mirror comprising
        a constant radius concavo-convex replacement mirror of substantially constant thickness having a convex viewing face and an oppositely disposed concave rear face, and a rim peripherally disposed between and spacing apart said convex viewing face and said concave rear face, said replacement mirror being predeterminately dimensioned for coextensively overlaying said flat mirror in substantial edge-to-edge adjacency therewith so as to substantially completely cover and thereby replace said flat mirror when operably secured thereto,
        a mounting portion disposed along an edge of the concave rear face of said replacement mirror and comprising a unitary replacement mirror edge portion at which said concave rear face has been flattened to a thickness less than said constant thickness of said replacement mirror to define a mounting portion for conformal abutment with a corresponding edge portion of the substantially flat mirror when said replacement mirror is operably secured in edge-to-edge adjacency thereto, and
    adhesive means interposed between said replacement mirror mounting portion and a corresponding surface portion of the substantially flat mirror for permanently securing said replacement mirror to and cover said flat mirror in coextensive replacement thereof so that said rim projects out of the plane of said flat mirror.

2. The combination of claim 1, wherein said mounting portion of said replacement mirror has varying thickness which decreases from the constant thickness of said replacement mirror to a predetermined minimum thickness along the replacement mirror periphery at said mounting portion.

3. The combination of claim 2, wherein said adhesive means comprises a pressure sensitive tape bonded to said rear face of the replacement mirror in overlying relation to at least a part of said mounting portion.

4. The combination of claim 3, wherein said replacement mirror further comprises a first surface coated mirror which is mirrored on said convex viewing face thereof.

5. The combination of claim 3, wherein said concavo-convex replacement mirror has substantially constant radius of curvature in the range of 60 inches to 120 inches.

6. The combination of claim 3, wherein said concavo-convex replacement mirror has substantially constant radius of curvature of approximately 60 inches.

7. The combination of claim 3, wherein said concavo-convex replacement mirror has substantially constant radius of curvature of approximately 120 inches.

* * * * *